United States Patent [19]

Antonious

[11] E Re. 31,538

[45] Reissued Mar. 20, 1984

[54] GOLF GLOVE

[76] Inventor: Anthony J. Antonious, 205 E. Joppa Rd., Unit 1603, Towson, Md. 21204

[21] Appl. No.: 491,552

[22] Filed: May 4, 1983

Related U.S. Patent Documents

Reissue of:

[64] Patent No.: 3,588,917
Issued: Jun. 29, 1971
Appl. No.: 840,347
Filed: Jul. 9, 1969

[51] Int. Cl.[3] ..... A41D 19/00

[52] U.S. Cl. ..... 2/161 A

[58] Field of Search ..... 2/159, 160, 161 R, 161 A, 2/162, 169, 16

[56] References Cited

U.S. PATENT DOCUMENTS

| | | | |
|---|---|---|---|
| 198,921 | 1/1878 | Butts . | |
| 325,968 | 9/1885 | Rawlings . | |
| 402,287 | 4/1889 | Tyrrell . | |
| 482,647 | 9/1892 | Obear . | |
| 594,499 | 11/1897 | Suit | 2/161 R |
| 651,701 | 6/1900 | Delamere . | |
| 753,000 | 2/1904 | Phillips . | |
| 785,190 | 3/1905 | Urwick . | |
| 889,397 | 6/1908 | O'Shaughnessy . | |
| 1,072,560 | 9/1913 | Baskin . | |
| 1,083,795 | 1/1914 | Brokaw . | |
| 1,106,708 | 8/1914 | Hazard | 2/159 |
| 1,113,870 | 10/1914 | Billings . | |
| 1,149,139 | 8/1915 | Heagle . | |
| 1,162,821 | 12/1915 | Taylor . | |
| 1,173,971 | 2/1916 | Hunter | 2/160 X |
| 1,200,580 | 10/1916 | Brenner . | |
| 1,286,771 | 12/1918 | Raymond . | |
| 1,513,237 | 10/1924 | Green . | |
| 1,612,822 | 1/1927 | Jones . | |
| 1,613,664 | 1/1927 | Lewandowski . | |
| 1,627,382 | 5/1927 | Golomb . | |
| 1,630,730 | 5/1927 | Daugherty . | |
| 1,716,221 | 6/1929 | Fernie . | |
| 1,763,813 | 6/1930 | O'Neil . | |
| 1,815,412 | 7/1931 | Lindfelt . | |
| 1,844,881 | 2/1932 | Bichelani . | |
| 1,887,278 | 11/1932 | Auster . | |
| 1,900,395 | 3/1933 | Gitt . | |
| 1,922,095 | 8/1933 | Jones | 2/159 |
| 1,982,431 | 11/1934 | Hines | 2/160 |
| 2,025,357 | 12/1935 | Pagan | 2/161 |
| 2,066,428 | 1/1937 | Straus | 2/162 |
| 2,083,604 | 6/1937 | Hay | 2/159 |
| 2,092,574 | 9/1937 | Eddy . | |
| 2,141,739 | 12/1938 | Burke | 2/162 X |
| 2,187,987 | 1/1940 | Sherrick | 2/160 |
| 2,251,027 | 7/1941 | Baker | 2/161 |
| 2,258,999 | 10/1941 | Nunn | 2/159 |
| 2,270,363 | 1/1942 | Weeber | 2/159 |
| 2,270,882 | 1/1942 | Link | 2/159 |
| 2,293,347 | 8/1942 | Lindfelt | 2/159 |
| 2,302,875 | 11/1942 | Lykins | 2/159 |
| 2,309,476 | 1/1943 | Patterson, Jr. | 2/159 |
| 2,309,516 | 1/1943 | Lindfelt | 2/159 |
| 2,314,545 | 3/1943 | Lindfelt | 2/159 |
| 2,327,836 | 8/1943 | Willard | 2/159 |
| 2,432,325 | 12/1947 | McDougall | 2/160 |
| 2,436,755 | 2/1948 | Lapell | 2/159 |
| 2,447,951 | 8/1948 | Lindfelt | 2/159 |
| 2,456,678 | 12/1948 | Cole | 2/159 |
| 2,522,344 | 9/1950 | Carmin | 2/160 |
| 2,554,991 | 5/1951 | Kramer | 2/159 |
| 2,559,788 | 7/1951 | Patterson | 2/161 A |
| 2,566,580 | 9/1951 | Patterson | 2/159 |
| 2,702,906 | 3/1955 | Causse | 2/159 |
| 2,708,753 | 5/1955 | Kennedy | 2/159 |
| 2,723,399 | 11/1955 | Waller | 2/165 |
| 2,751,598 | 6/1956 | Romeo | 2/161 |
| 2,773,264 | 12/1956 | Nover | 2/159 |
| 2,852,779 | 9/1958 | Roessler | 2/161 |
| 2,858,542 | 11/1958 | Ogg | 2/161 |
| 2,928,102 | 3/1960 | Canausa | 2/161 |
| 3,031,680 | 5/1962 | Compiano | 2/159 |
| 3,065,472 | 11/1962 | Linnell | 2/161 |
| 3,096,523 | 7/1963 | Bruchas | 2/159 |
| 3,098,237 | 7/1963 | Slimovitz | 2/164 |
| 3,105,972 | 10/1963 | Christopher | 2/161 |
| 3,114,951 | 12/1963 | DeMestral | 24/204 |
| 3,224,012 | 12/1965 | Hamm | 2/161 |
| 3,229,307 | 1/1966 | Jamison | 2/162 |
| 3,238,939 | 3/1966 | Stubbs | 128/165 |
| 3,255,462 | 6/1966 | Antonious | 2/161 |
| 3,274,616 | 9/1966 | Russo | 2/161 |
| 3,348,238 | 10/1967 | Hydock | 2/161 |
| 3,369,258 | 2/1968 | Smith | 2/159 |
| 3,372,401 | 3/1968 | Woodward | 2/159 |

| | | | |
|---|---|---|---|
| 3,394,408 | 7/1968 | Bush | 2/159 |
| 3,411,159 | 11/1968 | Berkhemer | 2/159 |
| 3,430,265 | 3/1969 | Mazza | 2/162 |
| 3,501,773 | 3/1970 | Stansberry et al. | 2/159 |
| 3,649,967 | 0/1972 | Millman | 2/161 |

*Primary Examiner*—Louis Rimrodt
*Attorney, Agent, or Firm*—Bernard, Rothwell & Brown

[57] ABSTRACT

A golf glove that provides a taut fit on the *wearer's* palm and fingers by providing elastic means across the [knuckles] *knuckle area* of the glove that cooperate with a fastener. A deep vent *portion in glove* opening can be provided on the back portion to permit easy entry of the hand. The glove can be adjustably fastened upon the hand by one or more Velcro nylon tabs which can be directly attached to one side of the deep vent *portion of glove* opening or can be attached through a ring with a flexible strap to provide a double closure. The palm portion of the glove can be provided with a reinforced pad and vent perforations. An additional pad can be extended between the webbing of the thumb and index fingers to ensure protection for other sports. A ball marker can be locked into the Velcro tab fastener or separately attached to the glove.

30 Claims, 13 Drawing Figures

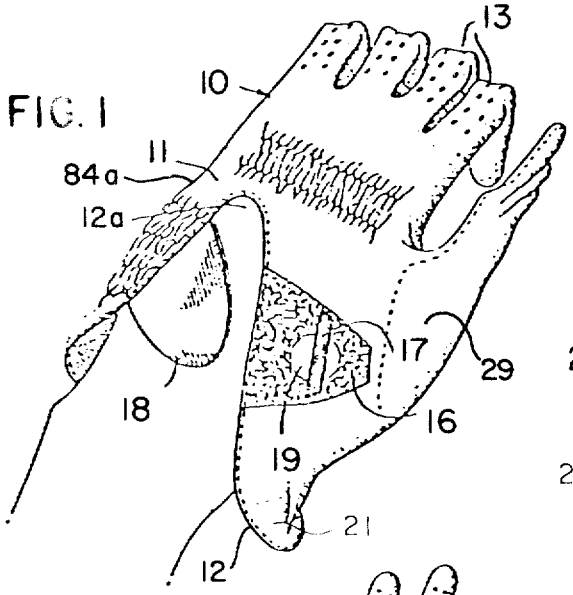
FIG. 1
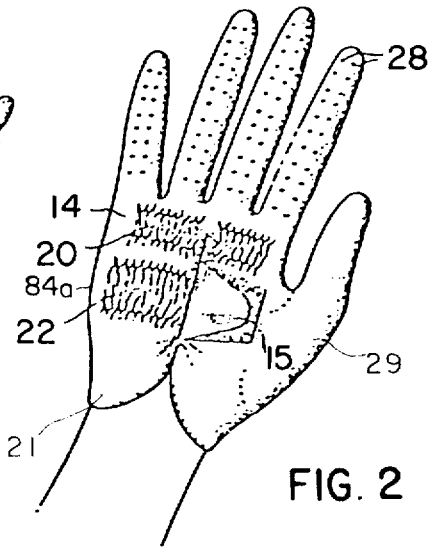
FIG. 2
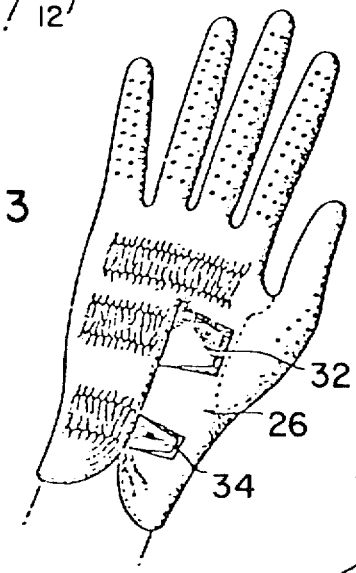
FIG. 3
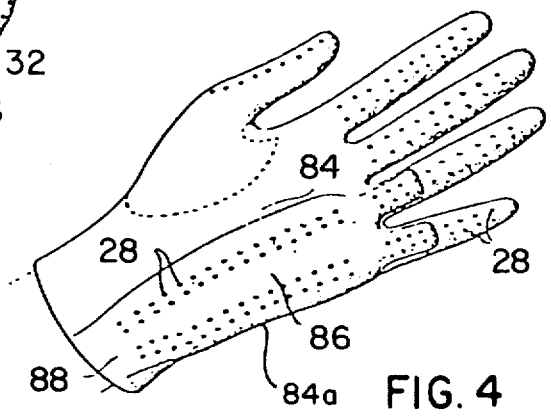
FIG. 4
FIG. 5
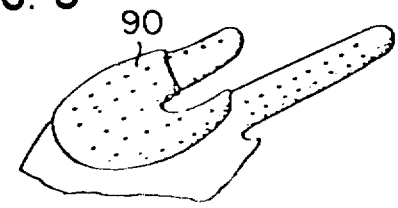
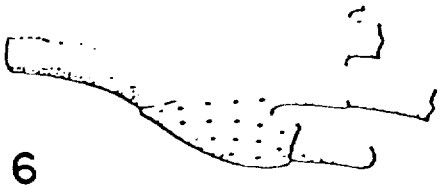
FIG. 6

FIG. 7
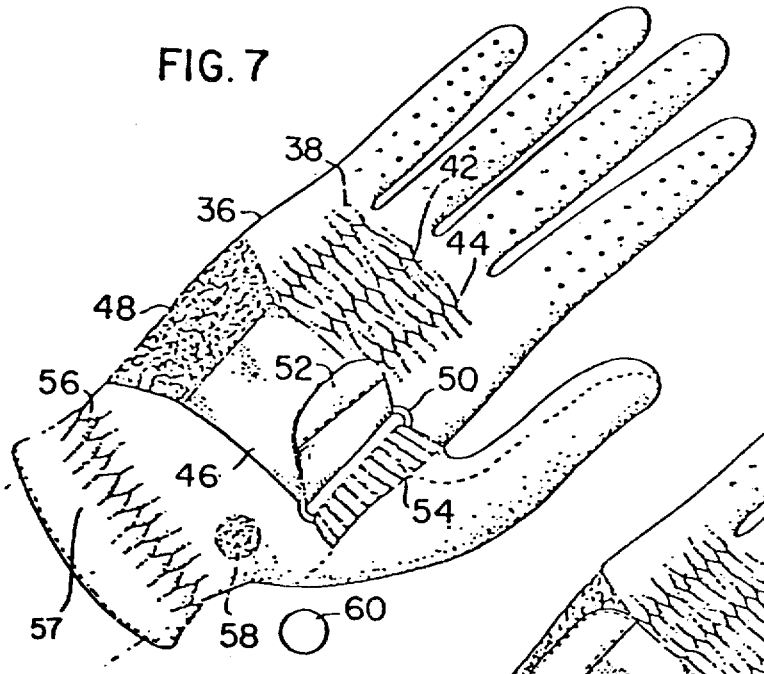
FIG. 8
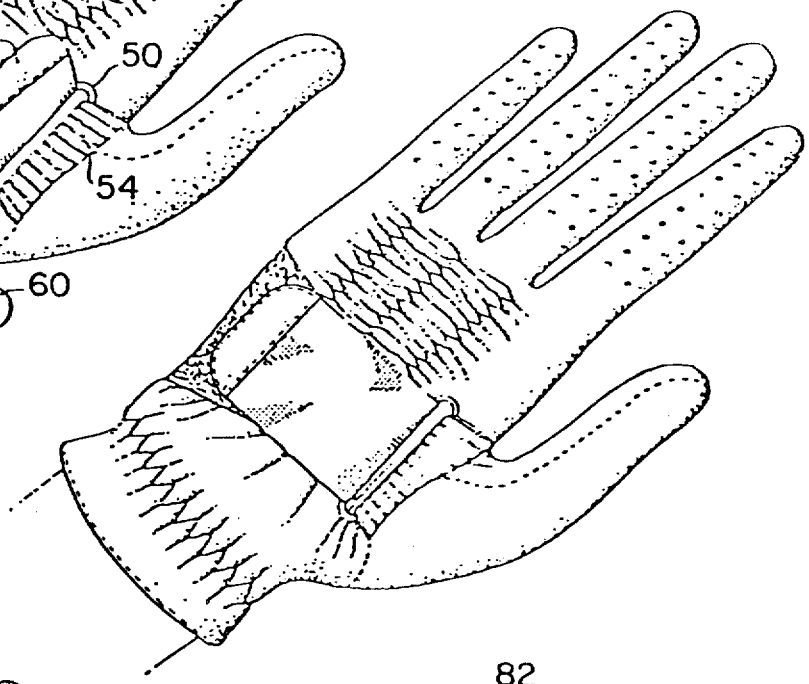
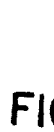
FIG. 13
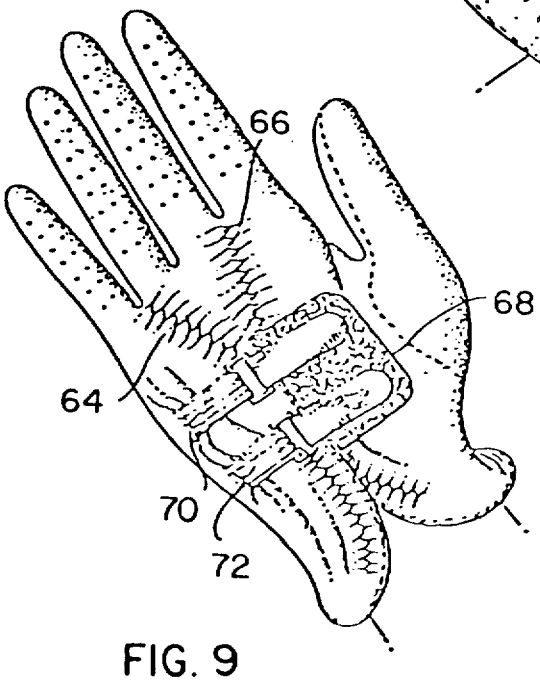
FIG. 9
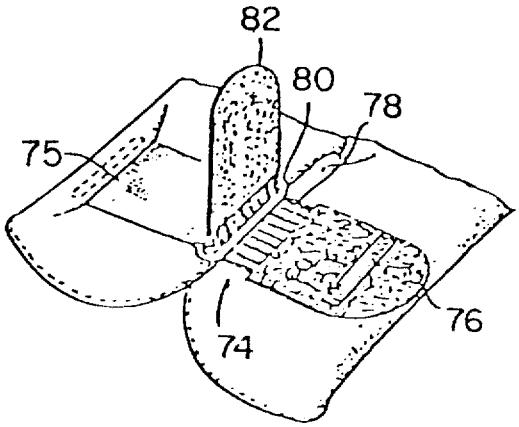
FIG. 10

GOLF GLOVE

Matter enclosed in heavy brackets [ ] appears in the original patent but forms no part of this reissue specification; matter printed in italics indicates the additions made by reissue.

BACKGROUND OF THE INVENTION

Field of the invention

This invention relates generally to a glove utilized in sports events, and more particularly, to a glove which allows the wearer's hand to be easily inserted and removed while ensuring a taut, snug fit when the glove is in use.

Description of the prior art

While the glove of this invention has been found useful in numerous sports activities such as sports car racing, tennis, baseball, and many others, it will be described with respect to its use in game of golf. Golf gloves are commonly worn by golfers on the hand which grips the club uppermost on the shaft for the purpose of improving the grip on the club handle, avoiding calluses and blisters, and minimizing perspiration which causes slippage.

The prior art has been persistently plagued with the problem of maintaining a taut fitting glove. It has attempted to solve this problem in many different manners. Some gloves have utilized thick bands of elastic embedded in the front and back of the wrist portion of the glove, while other attempts have simply relied upon a Velcro tab *located at the wrist area* to adjust the glove each time the wearer's hand is inserted into it. Numerous gadgets and gimmicks have been employed to negate the effect of the bunching or puckering glove on the wearer's golf game. For example, various grip locking assemblies, which utilized a direct adhesion of the glove to a complementary adhesive portion of the shaft handle have been attempted. Various locking straps, which circle both the hand and the shaft are also well known in the prior art along with numerous locking pads.

Despite these various attempts there still remains a need for a golf glove that can conform to the regulations established by the United States [Golfers] *Golf* Association while providing a taut fit that will remain throughout the life of the glove.

SUMMARY OF THE INVENTION

The glove construction of the present invention recognizes these persistent problems in the prior art and offers both an economical and simple solution. The material of the golf glove is by necessity thin and delicate to ensure the right feel and grip which is so important to the golfer, both physically and psychologically. The glove is not simply put on the golfer's hand and left there to the end of the game, but is frequently removed especially when the golfer reaches the green and utilizes his putter. During the hotter months of the summer, the golfer will frequently only put the glove on when he actually is about to strike the ball. The effect of perspiration and the environmental heat combined with the frequent insertion of the hand will result in stretching the thin glove material and, therefore, bunching or puckering its shape to such an extent that the glove will become useless before it actually physically wears out. This invention recognizes these problems and working within the necessary limitations of the golf glove material provides a simple golf glove construction which permits easy entry of the hand while still retaining the desirable taut fit throughout the life of the glove. This can be accomplished by the coaction of a deep vent *portion of glove* opening on the back portion of the glove with the elastic material positioned around the glove to eliminate any puckering or bunching when the vent opening has been closed by appropriate fasteners.

The glove is designed to permit use of Velcro nylon fasteners which can, for example, be in the form of a tab on one side of the vent and a complementary portion on the exterior surface of the other side of the vent. This fastener can also be modified to utilize a pair of tabs with appropriate complementary portions.

An [alternative] *alternate* and highly successful fastener involves the use of a flexible strap anchored to one side of the vent opening. This strap extends through a ring or the like anchored on the other side of the vent opening, and terminates in a Velcro tab. The complementary tab is fastened to the exterior back portion of the glove on the same side as the strap anchor. Pulling the free end of the strap through the ring and back to the complementary tab provides, in effect, a double thickness of the strap material to ensure a taut fit. A strap closure of this type is especially effective when the strap is constructed of elastic material, or when the ring is attached to elastic material and anchored on the glove.

The elastic material embedded in the back portion of the glove body, is preferably positioned longitudinal to the direction of the finger stalls and adjacent or over the knuckles. This placement of the embedded elastic has been found to minimize any bunching or puckering when the glove is securely fastened on the hand. Elastic elements attached along diagonal lines drawn respectively from the base of the knuckles of the small finger and index finger to the opposite sides of the wrist, have been found to almost approximate the fit achieved by longitudinal embedded elastic. The palm [potrion] *portion* of the glove can be provided with reinforcement by providing an additional thickness of glove material or any reinforcing material, such as a polyethylene or sponge rubber pad. This reinforced section permits the glove to be perforated with vent holes over a substantial portion of the palm area which provides ventilation to minimize perspiration problems, thereby permitting a more positive grip. It has been discovered that a glove will generally be pulled over the hand by grasping the lower wrist portion below the heel of the palm with the other hand, and tugging it down until the material tautly covers the fingers. This method of installing the glove has been found to shorten the life of the average golf glove and has prohibited the installation of a satisfactory number of perforated vent holes. Thus, the reinforced section both protects the wearer's hand while increasing the gripping qualities and the life of the glove.

An auxiliary pad can be installed across the front and back of the web portion of the glove extending between the glove and the index finger of the wearer's hand. This auxiliary pad would permit the glove to be utilized in sports requiring an overhand grip on the club, such as in baseball and tennis, and thus eliminate the calluses and blisters which are characteristic of these sports.

The Velcro nylon tab fastener can be provided with an elastic strap for holding a ball marker that is used to indicate the position of the golf ball on the green. An [alternative] *alternate* method of providing a place for a ball marker on a golf glove is to utilize a ball marker with Velcro adhered to the underside and thereby capable of being attached to a Velcro base fastened onto the glove.

The advantageous taut fit, particularly in the manicured of contoured fit of the fingers, can be utilized in any gloves that desire such a fit, either for fashion or utility.

The above aspects of the invention and other objects, features, and advantages will become more apparent from the consideration of the following detailed description when taken in conjunction with the accompanying drawings.

BRIEF DESCRIPTION OF THE DRAWINGS

FIG. 1 is a pictorial representation of the golf glove of this invention on the left hand of the right handed golfer as the hand is being inserted into the *glove opening with the* deep vent [opening] *portion* having Velcro [tab] fasteners on opposite sides thereof.

FIG. 2 is the [samee] *same* view as FIG. 1 with the *deep* vent [opening] *portion* closed by the Velcro tab fasteners to position the glove tautly on the hand.

FIG. 3 is a view of the back portion of an [alternative] *alternate* glove utilizing two Velcro tab fasteners.

FIG. 4 is a view of the palm of the glove with [vent] *ventilation* perforations and a reinforcing pad.

FIG. 5 is a sectional view of the thumb and forefinger of the glove of this invention with an auxiliary pad positioned between the thumb and the forefinger.

FIG. 6 is a view as in FIG. 5, only showing the back portion of the auxiliary pad.

FIG. 7 is a pictorial representation of the back portion of a modified glove with the Velcro strap fastener being in an open position.

FIG. 8 is the same view as FIG. 7 with the fastener closed.

FIG. 9 is a view of the back portion of a glove with twin Velcro strap fasteners.

FIG. 10 is a fragmentary view of the back portion of a glove showing a Velcro tab fastener with an elastic strap.

FIG. 13 is a side view of a ball marker used with the modified glove of FIG. 7.

DESCRIPTION OF THE PREFERRED EMBODIMENT

Figure 11:
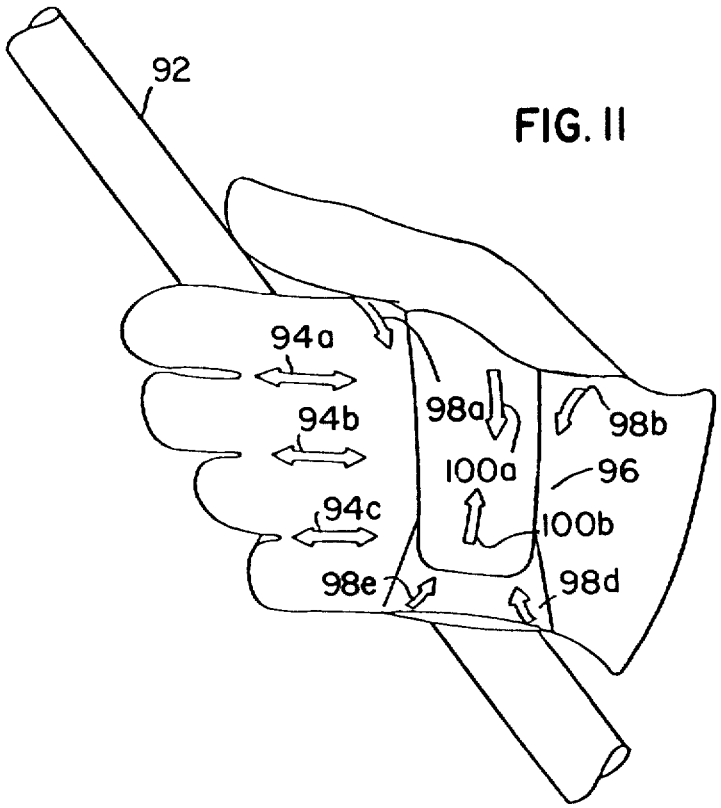
FIG. 11 is a schematic illustration of a gloved hand showing the forces developed to keep the glove taut.

Referring to the drawings, and more particularly to FIG. 1, the glove 10, of this invention, is illustrated for the left hand of the right handed golfer. The glove includes a back portion 11 with finger sheaths or stalls 13 for the [forefingers] *four fingers* and *stall 29 for* the thumb. *The front portion of the glove includes a palm portion 84, and there is a palm heel area 84a between the front and back portions. See FIG. 4.* It is to be understood that the finger stalls of this invention need not be fully extended in the form illustrated. For example, it is not necessary that this glove [includes] *include* a thumb stall or that the fingers be completely covered. *Moreover, as shown in the drawings the glove has an access opening 12 for a wearer's hand.* The glove is preferably constructed of a light leather on other flexible fabric material. The back portion 11 has a deep vent *portion 12a in access* opening 12 which extends from the wrist *area 21* to *an area at* approximately the base of the [knuckles 14] *knuckle area 14.* This *access opening 12 with* deep vent *portion 12a* is designed specifically to permit easy entry and removal of the hand. The back portion 11 includes appropriately placed elastic strips 20 and 22, which are structurally arranged to cooperate with the deep vent *portion of access* opening *and a Velcro tab fastener* to provide a taut snug fit, as illustrated in FIG. 2. The elastic material as shown in this embodiment, is positioned adjacent the [knuckles] *knuckle area 14* and on the back of the hand to ensure a taut fit across the palm. Note the force arrows on FIG. 11 to be described later. The positioning of this elastic material has been found to complement the natural movement of the hand and thus minimize the tendency to bunch or pucker. The deep vent *portion 12a of access* opening 12 can be appropriately closed by a fastener 15, *located adjacent knuckle area 14, see FIGS. 1, 2 and 3* which, in the preferred embodiment, consists of Velcro fasteners which are easy to open and provide an adjustable fit to the individual hand. *As is known, Velcro is flexible material capable of multiple adjustments by virtue of the "hooks" and "loops" locking elements on the fastenable portions.* The Velcro fastener consists of an exterior surface 16 on the back portion 11 that is composed of Velcro nylon "loops" or pile material, and a tab portion 18 secured to the side of the deep vent *portion 12a of access* opening *12* and composed of Velcro nylon hooks. *As shown in FIG. 2, for example, the Velcro fastener 15 is located adjacent the knuckle area 14 and positioned between thumb stall 29 and palm heel area 84a to span and close the deep vent portion 12a of the access opening 12, compare FIG. 1 with FIG. 2.*

Perforations or vent holes 28 are provided on the back of the fingers to both ventilate the hand and increase the inner locking grip of the golfer's other hand.

A strap 17, preferably of elastic, is fastened across the Velcro pile material to provide a holder for a ball marker 19.

FIG. 3 illustrates another embodiment of the glove constructed in accordance with the present invention wherein the fastener 26 consists of two separate Velcro tab closures 32 and 34. This model of the glove retains the taut fit of the first embodiment while permitting greater latitude in adjusting to the individual hand, and therefore helping to custom fit the glove to the particular wearer's hand.

The glove 36, illustrated in FIG. 7, discloses an [alternative] *alternate* embodiment that utilizes longitudinally extending elastic means 38, 42, and 44. These elastic means extend in the direction of the fingers and generally cover the knuckles of the wearer's hand. The elastic means can extend beyond the knuckles down toward the wrist. The fastener includes a flexible strap 46 which is anchored adjacent the Velcro pile material 48. The strap passes through a ring 50 which is preferably metal or plastic and terminates in a tab portion 52 which is composed of Velcro nylon hooks. The tab portion 52 is generally designed to prohibit the easy passage of the tab portion 52 through the ring 50. The ring is anchored adjacent the base of the thumb by an elastic strap 54. A taut fit around the wrist *area 57* is ensured by the elastic strap 56. The back of the glove contains a small portion of Velcro nylon pile material 58, which is capable of holding a ball marker 60, which has complementary Velcro nylon loops 62 adhered to its underside, as illustrated in FIG. 13. The ball marker is illustrated as being fastened to the back portion of the glove but it could be attached to the tab portion 52 or the strap 46.

FIG. 8 illustrates the same glove as described above with respect to FIG. 7 only shown in a taut closed position.

The glove, illustrated in FIG. 9, utilizes two strips of elastic material 64 and 66, preferably positioned across a pair of hypothetical diagonal lines that extend respectively from the base of the knuckle of the small finger across the back portion of the glove to the wrist, and from the knuckle of the index finger to the other side of the wrist. This positioning of elastic material, as with the other described forms, has been found to ensure a taut manicure or custom fit about the fingers. The fastener 68, illustrated in FIG. 9, is similar to the fastener used in the glove embodiment of FIG. 7. The two individual tab straps 70 and 72 help provide a customized fit.

The fastener, illustrated in FIG. 10, can, as with the other fasteners, be used with either a glove having a conventional closed back or a deep vent *portion in glove* opening. The fastener 74 comprises a flexible strap 76 which is anchored on one side of the glove and an exterior surface 76 of Velcro nylon "loops" or pile material. An elastic strap 78 is anchored adjacent the exterior surface of the Velcro pile material and extends through a loop 80[,] *anchored by material 75 and* terminating in the free end with a Velcro tab portion 82 composed of Velcro nylon hooks. When the Velcro fasteners 76 and 82 are closed, the flexible elastic strap 78 is doubled in tension and thus ensures a taut positive fit.

FIG. 4 illustrates the palm portion 84 *and a palm heel area 84a* of the golf glove and includes a pad or reinforcing material 86 such as polyurethane which can be sewn onto the glove. The pad 86, although susceptible of other shapes, is preferably from the wrist *area* 88 up to the base of the finger stalls. This reinforced area is capable of supporting numerous perforation or vent holes 28. These vent holes help to minimize perspiration and establish a positive fit. Previous golf gloves could only support a limited number of vent holes due to the delicate nature of the material from which the glove is made. With the use of the pad 86, the golf glove of this invention is capable of supporting the maximum number of vent holes that are desired in a golf glove. The reinforcing pad 86 serves another function in increasing the life of the golf glove. The average golfer will generally pull the glove onto the hand by grasping with his free hand the lower palm portion of the glove and then jerking or tugging the glove into position. This reinforcing pad 86 thereby provides the additional strength necessary to prevent ripping or tearing of the glove, while in addition allowing the appropriate number of ventilation holes 28. The reinforcing material 86 can be an additional thickness of glove material or a separate supplemental pad.

FIG. 5 illustrates an auxiliary pad 90, which covers the web portion of the hand from approximately the knuckle of the forefinger to above the knuckle of the thumb and thus provides a glove, in accordance with this invention, which is useful in other sports such as tennis or baseball. FIG. 6 shows the back portion of the auxiliary pad 90. The use of this pad helps remove the characteristic calluses and blisters which are common in this type of sport.

FIG. 11 is a schematic of a gloved hand holding a club 92. The force arrows 94A, 94B, 94C represent the effect of the elastic across the knuckles of the wearer's hand. The fastener 96, in combination with the elastic on the back portion of the glove, creates the diagonal force members 98A, 98B, 98C, and 98D, plus the cross force members 100A and 100B. As can be seen from this schematic, the unique combination of the elastic means and the closing means provides a taut fit through the fingers and across the palm portion of the glove. The location of the fastener just below the [knuckles] *knuckle area* ensures the positioning of the forces across the base of the palm and the base of the fingers, while the longitudinal elastic means across the knuckles ensures a proper fit in the fingers.

Figure 12:
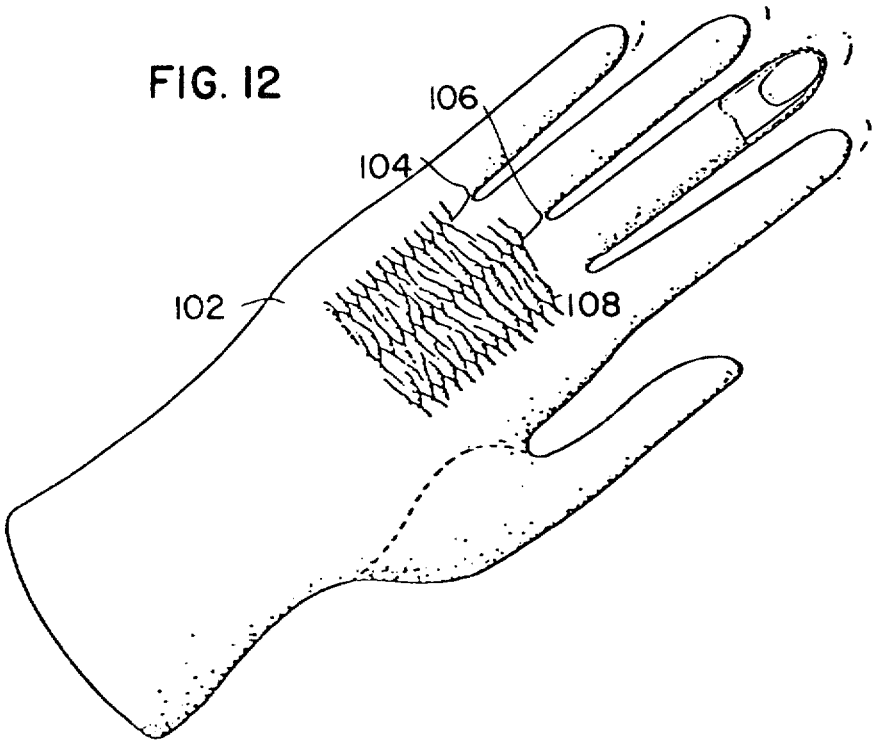
FIG. 12 is a view of a lady's glove with a section removed to show the taut fit about the finger.

FIG. 12 illustrates a dress glove 102 which has three elastic means 104, 106, and 108 across the knuckles and back portion of the glove in the direction of the fingers to provide a taut manicured fit to the fingers, as compared to the normal position of the glove, as illustrated by the dotted lines in FIG. 12.

What is claimed is:

1. An athletic glove comprising: a hollow flexible body member having *an access opening, a* front *portion* and *a* back [portions] *portion, said front portion including a palm area and said back portion including a knuckle area and a palm heel area located adjacent said knuckle area and between the front and back portions; glove* stalls for [at least] four fingers *and a thumb* of [the wearer] *a wearer's hand* projecting from the body member; the back portion being provided with [an] *a deep vent portion in the access* opening, *the deep vent portion* extending from the [end of] *access opening in* the body member to approximately the [stalls] *knuckle area*; first elastic means located in the back portion between the glove stalls and the *access* opening[,]; [a] *an elongated* flexible fastening tab extending from one edge of the *deep vent portion of the access* opening; a complementary fastener located *on the back portion* adjacent the opposite edge of the *deep vent portion of the access* opening [on the back portion], *said flexible fastening tab and said complementary fastener in combination providing multi-adjustable, separable hook and loop locking means for closing the deep vent portion; the flexible fastening tab and complementary fastener are located on opposite sides of the deep vent portion adjacent the knuckle area and positioned between the thumb stall and the palm heel area so that when the tab and complementary fastener coact to span and close the deep vent portion, direct pulling forces are applied to the back portion and the palm heel area to attain and retain a taut fit across the back and palm portions of the glove;* and second elastic means in conjunction with the back portion adjacent the flexible fastening tab.

2. An athletic glove as in claim 1, where the *deep vent portion of the access* opening is approximately triangular, having its base extending along the end of the glove body member.

3. An athletic glove as in claim 1, where the body member further includes a pad extending from the end of the body member along the front portion to approximately the stall area.

4. An athletic glove as in claim 1, where the complementary fastening portion includes a retainer means for holding a ball marker.

5. An athletic glove as in claim 1, where the first elastic means includes strips of elastic longitudinal to the body member.

6. An athletic glove as in claim 1, wherein the palm portion has a reinforcement and has a pattern of perforations.

7. An athletic glove as in claim 6, wherein the reinforcement is a pad which extends from the wrist up to the base of the finger stalls.

[8. An athletic glove as in claim 1, where the second elastic means connects the flexible fastening tab to the back portion.]

9. An athletic glove as in claim 1, where the second elastic means is attached to the back portion and the flexible fastening tab is attached directly to the back portion.

10. An athletic glove comprising a hollow flexible body member having *an access opening and* front and back portions; stalls for [at least] four fingers *and the thumb* of [the wearer] *a wearer's hand* projecting from the body member; the back portion being provided with [an] *a deep vent portion in the access* opening, *the deep vent portion* extending from the [finger stall area] *access opening in the body member* to approximately the [end of the body member] *knuckle area; an adjustable and flexible fastener having a portion located adjacent the knuckle area and positioned between a palm heel area and a thumb stall area, said fastener including* a loop; a flexible *fastening* strap *and complementary fastener*; the loop attached to one side of the *deep vent portion on the* back portion and the flexible *fastening* strap attached at one end to the other side of the *deep vent portion on the* back portion *for* extending in an unrestrained manner through the loop, a first locking means attached to the free end of the flexible *fastening* strap and a second *complementary* locking means attached to the back portion adjacent the connection of the flexible *fastening* strap with the back portion *on the other side of the deep vent portion, the first and second locking means including hook and loop material*, whereby the first and second locking means interact to fasten the free end of the flexible strap to the *complementary locking means on the* back portion of the glove for securing the glove on the [wearer] *wearer's hand*.

11. An athletic glove as in claim 10, where the flexible strap includes an elastic portion.

12. An athletic glove as in claim 11, further including elastic means located between the glove stalls and the opening for providing a taut fit of the glove on the wearer's hand; and an elastic strap attaching the loop to one side of the back portion.

*13. The athletic glove of claim 1 wherein said back portion includes a wrist area located below said palm heel area and said first elastic means is located at said wrist area.*

*14. The athletic glove of claim 1 wherein said first elastic means is located on the back portion proximate said knuckle area.*

*15. The athletic glove of claim 1 wherein said first elastic means is located on the back portion around said deep vent portion in said access opening.*

*16. The athletic glove of claim 1 wherein said second elastic means is aligned with said flexible fastening tab and said complementary fastener.*

*17. The athletic glove of claim 1 wherein said first elastic means is located on each side of the deep vent portion.*

*18. The athletic glove of claim 1 wherein the first elastic means extends between the knuckle area and the end of the body member.*

*19. The athletic glove of claim 1 wherein the first and second elastic means are between the glove stalls and the access opening at the end of the body member.*

*20. The athletic glove of claim 1 wherein the flexible fastening tab is attached directly to the back portion between the palm heel area and the deep vent portion.*

*21. An athletic glove including: a hollow flexible body member with an access opening, glove stalls including finger stalls and a thumb stall, a front portion and a back portion, a palm heel area between the front and back portions, said front portion including a palm portion and said back portion including a knuckle area adjacent to said finger stalls, said palm heel area located adjacent said knuckle area and transversely aligned with said palm portion, said back portion having at least two elastic means and a fastener, the invention comprising;*

*(a) said access opening including a deep vent portion extending from the access opening in said body member towards said finger stalls to approximately said knuckle area in said back portion;*

*(b) said fastener being an adjustable and flexible fastener including an elongated flexible fastening tab member and a coacting complementary fastening member, both members having flexible, multi-adjustable, separable fastening means including arrays of complementary hook and loop type material locking elements;*

*(c) said elongated flexible fastening tab member being located just adjacent said knuckle area on one side of said deep vent portion, at least a portion of said flexible fastening tab member positioned between said thumb stall and said palm heel area, said flexible fastening tab member being of sufficient width and length to extend across and close said deep vent portion of said glove opening to provide a taut fit across said palm portion and said back portion, and to secure said athletic glove on a wearer's hand;*

*(d) first elastic means located in said back portion between said glove stalls and said access opening in the body member;*

*(e) second elastic means in conjunction with said back portion located adjacent to said flexible fastening tab member.*

*22. The athletic glove of claim 21 wherein said back portion includes a wrist area located below said palm heel area and said first elastic means is located at said wrist area.*

*23. The athletic glove of claim 21 wherein said first elastic means is located on the back portion proximate said knuckle area.*

*24. The athletic glove of claim 21 wherein said first elastic means is located on the back portion around said deep vent portion of said access opening.*

*25. The athletic glove of claim 21 wherein said second elastic means is aligned with said flexible fastening tab and said complementary fastener.*

*26. The athletic glove of claim 21 wherein the first elastic means is located on each side of the deep vent portion.*

*27. The athletic glove of claim 21 wherein the first elastic means is located between the thumb stall and the end of the body member.*

*28. The athletic glove of claim 21 wherein the first elastic means extends between the knuckle area and the end of the body member.*

*29. An athletic glove as in claim 21 wherein the first and second elastic means are between the glove stalls including the finger stalls and thumb stall and the access opening at the end of the body member.*

*30. An athletic glove as in claim 21 wherein the flexible fastening tab is attached directly to the back portion between the palm heel area and the deep vent portion.*

* * * * *